United States Patent [19]

Pfaendner et al.

[11] Patent Number: 5,859,073
[45] Date of Patent: *Jan. 12, 1999

[54] POLYESTER/POLYCARBONATE BLENDS HAVING ENHANCED PROPERTIES

[75] Inventors: Rudolf Pfaendner, Rimbach; Kurt Hoffmann; Heinz Herbst, both of Lautertal, all of Germany

[73] Assignee: Ciba Specialty Chemicals Corportation, Tarrytown, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 737,844

[22] PCT Filed: May 17, 1995

[86] PCT No.: PCT/EP95/01887

§ 371 Date: Nov. 25, 1996

§ 102(e) Date: Nov. 25, 1996

[87] PCT Pub. No.: WO95/33004

PCT Pub. Date: Dec. 7, 1995

[30] Foreign Application Priority Data

May 27, 1994 [CH] Switzerland ............... 1644/94

[51] Int. Cl.$^6$ .................................... C08J 11/04
[52] U.S. Cl. ............... 521/48; 524/151; 524/604; 525/438
[58] Field of Search ............... 521/47, 48, 291, 521/151, 153, 117, 119, 121; 525/438; 524/151, 604

[56] References Cited

U.S. PATENT DOCUMENTS

| | | |
|---|---|---|
| 3,886,104 | 5/1975 | Borman et al. ............ 524/114 |
| 3,945,967 | 3/1976 | Jaguiss .................... 524/114 |
| 4,076,686 | 2/1978 | Calkins .................... 524/114 |
| 4,122,063 | 10/1978 | Alexander et al. ........ 524/114 |
| 4,276,208 | 6/1981 | Gawa et al. .............. 524/114 |
| 4,277,391 | 7/1981 | Charles .................... 524/114 |
| 4,348,500 | 9/1982 | Robeson et al. .......... 525/438 |
| 4,486,561 | 12/1984 | Chung et al. ............. 524/114 |
| 4,538,367 | 9/1985 | Rawlings .................. 525/438 |
| 4,539,352 | 9/1985 | Chung et al. ............. 524/114 |
| 4,722,955 | 2/1988 | Dick .......................... 524/114 |
| 4,873,279 | 10/1989 | Nelson ...................... 524/114 |
| 4,999,388 | 3/1991 | Okamato ................... 525/438 |
| 5,254,610 | 10/1993 | Small et al. .............. 524/120 |
| 5,354,791 | 10/1994 | Gallucci ................... 525/438 |
| 5,747,606 | 5/1998 | Pfaendner et al. ........ 525/438 |

FOREIGN PATENT DOCUMENTS

| | | |
|---|---|---|
| 0048483 | 3/1982 | European Pat. Off. . |
| 0073042 | 3/1983 | European Pat. Off. . |
| 531008 | 3/1993 | European Pat. Off. .......... 521/48 |
| 9303092 | 2/1993 | WIPO . |

*Primary Examiner*—Veronica P. Hoke
*Attorney, Agent, or Firm*—Luther A. R. Hall; Jacob M Levine; Michele A. Kovaleski

[57] ABSTRACT

A PES/PC blend having enhanced properties as virgin material and as recyclate comprises:

A) at least one metal oxide or metal salt of a fatty acid; and

B) at least one phosphite and at least one sterically hindered phenol or
at least one difunctional epoxy resin or
a combination of both.

15 Claims, No Drawings

POLYESTER/POLYCARBONATE BLENDS HAVING ENHANCED PROPERTIES

The invention relates to polyester/polycarbonate blends having enhanced properties as well as to a process for enhancing the properties of polyester/polycarbonate blends.

Polyester/polycarbonate blends (PES/PC) such as polybutylene terephthalate/PC blends (PBT/PC) or polyethylene terephthalate/polycarbonate blends (PET/PC), or ternary blends such as PBT/PC/ABS, are important engineering plastics. These blends unite the properties of the starting polymers, such as high impact strength at room temperature and at low temperature, high rigidity, low susceptibility to stress-cracking, good resistance to chemicals, in particular to fuel, and easy coatability. Because of these properties, PBT/PC blends are preferably used for lacquered parts of large dimensions, for example in the automotive industry for the production of car bumpers. Since the production of these parts demand relatively long cycle times at elevated temperature, efficient processing stabilisation is essential.

The mechanical and physical properties of these blends furthermore depend essentially on the molecular weight of the polymer. During processing and use, however, the PES/PC blends are often damaged, resulting in reduced molecular weight. High-quality recycling of used PES/PC blends and of production waste therefore requires an increase of the molecular weight.

Accordingly, it is the object of the present invention to provide PES/PC blends, more particularly PBT/PC recyclates, having enhanced properties. In this context, enhancing the properties will be taken to mean in particular enhancing the processing stability and/or increasing the molecular weight. The increase of the molecular weight may relate either to a single component of the blend or to both or several components of the blend simultaneously.

Surprisingly, it has been found that a mixture of at least one metal oxide or metal salt of a fatty acid, either in combination with a phosphite and a sterically hindered phenol or in combination with a difunctional epoxy resin, substantially enhances the properties of the blend.

Accordingly, the invention relates to a PES/PC blend comprising a) at least one metal oxide or metal salt of a fatty acid, and $b_1$) at least one phosphite and at least one sterically hindered phenol, or $b_2$) at least one difunctional epoxy resin, or a combination of $b_1$) and $b_2$), and containing 0.01–10 parts of component a) per 100 parts of PES/PC blend.

In particular, the present invention relates to PES/PC blend recyclates, more particularly to PBT/PC or PET/PC and, very particularly, to PBT/PC recyclates. Such recyclates originate, for example, industrial waste or useful material collections, production wastes or obligatory returnables. These recyclates may be obtained, for example, already as blend (for example in the case of car bumper materials), but may also be used as separate polymers for the preparation of the recyclate blend (e.g. PET from bottles and PC from rib-enforced sandwich panels of roof linings, or e.g. from returnable bottles. The recyclates may in particular be recyclates from car bumpers.

Furthermore, according to this invention only one component of the blend can be in the form of scrap material, for example PET bottle recyclate in combination with PC virgin material.

In a preferred embodiment of the invention, the polyester/polycarbonate blend comprises in addition to a) also $b_1$) and $b_2$).

The polyesters may be homopolyesters or copolyesters that are derived from aliphatic, cycloaliphatic or aromatic dicarboxylic acids and diols or hydroxycarboxylic acids.

The aliphatic dicarboxylic acids may contain from 2 to 40 carbon atoms, the cycloaliphatic dicarboxylic acids from 6 to 10 carbon atoms, the aromatic dicarboxylic acids from 8 to 14 carbon atoms, the aliphatic hydroxycarboxylic acids from 2 to 12 carbon atoms, and the aromatic as well as the cycloaliphatic hydroxycarboxylic acids from 7 to 14 carbon atoms.

The aliphatic diols may contain from 2 to 12 carbon atoms, the cycloaliphatic diols from 5 to 8 carbon atoms and the aromatic diols from 6 to 16 carbon atoms.

Aromatic diols will be taken to mean those in which two hydroxyl groups are bonded to one aromatic hydrocarbon radical or to different aromatic hydrocarbon radicals.

The polyesters may also be branched with minor amounts, typically 0.1 to 3 mol %, based on the dicarboxylic acids, of more than difunctional monomers (e.g. pentaerythritol, trimellitic acid, 1,3,5-tri(hydroxyphenyl)benzene, 2,4-dihydroxybenzoic acid or 2-(4-hydroxyphenyl)-2-(2,4-dihydroxyphenyl)propane).

If the polyesters are based on at least 2 monomers, said monomers may be randomly distributed, or they may be block copolymers.

Suitable dicarboxylic acids are linear and branched saturated aliphatic dicarboxylic acids, aromatic dicarboxylic acids and cycloaliphatic dicarboxylic acids.

Suitable aliphatic dicarboxylic acids are those containing 2 to 40 carbon atoms, typically oxalic acid, malonic acid, dimethylmalonic acid, succinic acid, pimelic acid, adipic acid, trimethyladipic acid, sebacic acid, azelaic acid and dimer acids (dimerisation products of unsaturated aliphatic carboxylic acids such as oleic acid), alkylated malonic and succinic acids such as octadecylsuccinic acid.

Suitable cycloaliphatic dicarboxylic acids are:
1,3-cyclobutanedicarboxylic acid, 1,3-cyclopentanedicarboxylic acid, 1,3- and 1,4-cyclohexanedicarboxylic acid, 1,3- and 1,4-(dicarboxylmethyl)cyclohexneane, 4,4'-dicyclohexyldicarboxylic acid.

Suitable aromatic dicarboxylic acids are:
preferably terephthalic acid, isophthalic acid, o-phthalic acid, as well as 1,3-, 1,4-, 2,6- or 2,7-naphthalenedicarboxylic acid, 4,4'-diphenyldicarboxylic acid, 4,4'-diphenylsulfonecarboxylic acid, 4,4'-benzophenonedicarboxylic acid, 1,1,3-trimethyl-5-carboxyl-3-(p-carboxylphenyl)indane, 4,4'-diphenyl ether dicarboxylic acid, bis-p-(carboxylphenyl)methane or bis-p-(carboxylphenyl)ethane.

The aromatic dicarboxylic acids are preferred, including in particular terephthalic acid and isophthalic acid.

Further suitable dicarboxylic acids are those that contain —CO—NH— groups and which are disclosed in DE-A 2 414 349. Dicarboxylic acids that contain N-heterocyclic rings are also suitable, for example those that are derived from carboxylalkylated, carboxylphenylated or carboxybenzylated monoaine-s-triazinedicarboxylic acids (q.v. DE-A 2 121 184 and 2 533 675), mono- or bishydantoins, benzimidazolenes or halogenated benzimidazolenes or parabanic acid. The carboxyalkyl groups may contain from 3 to 20 carbon atoms.

Suitable aliphatic diols are the linear and branched aliphatic glycols, preferably those containing 2 to 12, most preferably 2 to 6, carbon atoms in the molecule, typically including:

ethylene glycol, 1,2- and 1,3-propylene glycol, 1,2-, 1,3-, 2,3- or 1,4-butanediol, pentyl glycol, neopentyl glycol, 1,6-hexanediol, 1,12-dodecanediol. A suitable cycloaliphatic diol is conveniently 1,4-dihydroxycyclohexane. Further suitable aliphatic diols are typically 1,4-bis(hydroxymethyl)cyclohexane, aromatic-aliphatic diols such as p-xylylene glycol or 2,5-dichloro-p-xylylene glycol, 2,2-(β-hydroxyethoxyphenyl)propane, as well as polyoxyalkylene glycols such as diethylene glycol, triethylene glycol, polyethylene glycol or polypropylene glycol. The alkylene diols are preferably linear and preferably contain 2 to 4 carbon atoms.

Preferred diols are the alkylene diols, 1,4-dihydroxycyclohexane and 1,4-bis(hydroxymethyl) cyclohexane. Ethylene glycol and 1,4-butanediol are especially preferred.

Further suitable aliphatic diols are the β-hydroxyalkylated, preferably β-hydroxyethylated, bisphenols such as 2,2-bis[4'-(β-hydroxyethoxy)phenyl]propane. Further bisphenols are mentioned hereinafter.

A further group of suitable aliphatic diols comprises the heterocyclic diols disclosed in German Offenlegungsschrift specifications 1 812 003, 2 342 432, 2 342 372 and 2 453 326 Illustrative examples are:

N,N'-bis(β-hydroxyethyl-5,5-dimethyl)hydantoin, N,N'-bis(β-hydroxypropyl-5,5-dimethyl) hydantoin, methylenebis[N-(β-hydroxyethyl)-5-methyl-5-ethylhydantoin], methylenebis[N-(β-hydroxyethyl)-5,5-dimethylhydantoin], N,N'-bis(β-hydroxyethylbenzylimidazolone, -(tetrachloro) benzimidazolone or -(tetrabromo)benzimidazolone.

Suitable aromatic diols are mononuclear diphenols and, preferably, dinuclear diphenols which carry a hydroxyl group at each aromatic nucleus. By aromatic are meant preferably aromatic hydrocarbon radicals such as phenylene or naphthylene. In addition to e.g. hydroquinone, resorcinol or 1,5-, 2,6- and 2,7-dihydroxynaphthaline, those bisphenols merit special mention that may be illustrated by the following formulae:

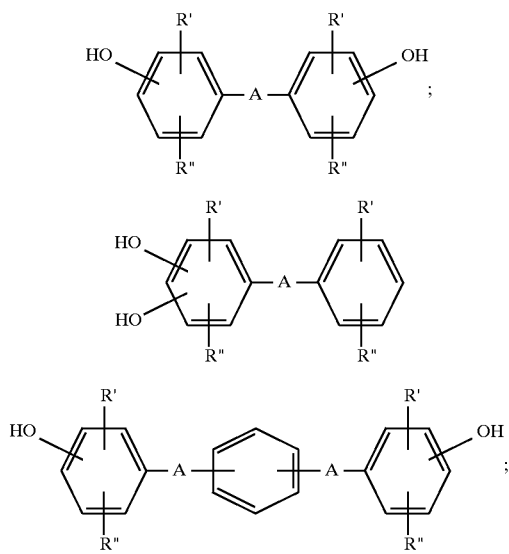

-continued

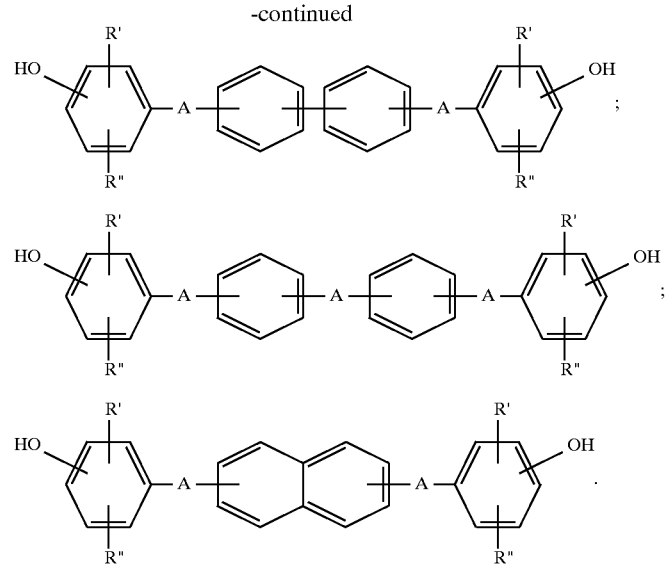

The hydroxyl groups may be in m-position, but are preferably in p-position. R' and R" in this formula may be alkyl of 1 to 6 carbon atoms, halogen such as chloro or bromo and, in particular, hydrogen atoms. A may be a direct bond or O, S, $SO_2$, CO, $P(O)(C_1-C_{20}alkyl)$, unsubstituted or substituted alkylidene, cycloalkcylidene or alkylene.

Unsubstituted or substituted alkylidene is exemplified by:
  ethylidene, 1,1- or 2,2-propylidene, 2,2-butylidene, 1,1-isobutylidene, pentylidene, hexylidene, heptylidene, octylidene, dichloroethylidene, trichloroethylidene.

Illustrative examples of unsubstituted or substituted alkylene are methylene, ethylene, phenylmethylene, diphenylmethylene, methylphenylmethylene. Illustrative examples of cycloalkylidene are cyclopentylidene, cyclohexylidene, cycloheptylidene and cyclooctylidene.

Illustrative examples of bisphenols are:
  bis(p-hydroxyphenyl) ether or thioether, bis(p-hydroxyphenyl)sulfone, bis(p-hydroxyphenyl) methane, bis(4-hydroxyphenyl)-2,2-biphenyl, phenylhydroquinone, methylhydroquinone, trimethylhydroqinone, 1,2-bis(p-hydroxyphenyl) ethane, 1-phenyl-bis(p-hydroxyphenyl)methane, diphenyl-bis(p-hydroxyphenyl)methane, diphenyl-bis (p-hydroxyphenyl)-methane, bis(3,5-dimethyl4-hydroxyphenyl)sulfone, bis(3,5-dimethyl-4-hydroxyphenyl)-p-diisopropylbenzene, bis(3,5-dimethyl-4-hydroxyphenyl)-m-diisopropylbenzene, 2,2-bis (3',5'-dimethyl-4'-hydroxyphenyl)propane, 1,1 - or 2,2-bis(p-hydroxyphenyl)butane, 2,2-bis(p-hydroxyphenyl)hexafluoropropane, 1,1-dichloro- or 1,1,1-trichloro-2,2-bis-(p-hydroxyphenyl) ethane, 1,1-bis(p-hydroxyphenyl)cyclopentane and, preferably, 2,2-bis-(p-hydroxyphenyl)propane (bisphenol A) and 1,1-bis(p-hydroxyphenyl)cyclohexane (bisphenol C).

Suitable polyesters of hydroxycarboxylic acids typically include polycaprolactone, polypivalolactone or the polyesters of 4-hydroxycyclohexanecarboxylic acid or 4-hydroxybenzoic acid.

Also suitable are polymers containing mainly ester bonds, but also other bonds, such as polyester amides or polyester imides.

Polyesters with aromatic dicarboxylic acids have achieved the greatest importance, in particular the polyalkylene terephthalates. Inventive moulding materials are therefore preferred in which the polyester is comprised of at least 30 mol %, preferably of at least 40 mol %, of aromatic dicarboxylic acids, and of at least 30 mol %, preferably of at least 40 mol %, of alkylenediols containing preferably 2 to 12 carbon atoms, based on the polyester.

Especially in this case the alkylenediol is linear and contains 2 to 6 carbon atoms and is exemplified by ethylene, trimethylene, tetramethylene or hexamethylene glycol and the aromatic dicarboxylic acid is terephthalic and/or isophthalic acid.

Particularly suitable polyesters are PET, PBT and corresponding copolymers.

Polycarbonate (PC) is typically obtained from bisphenol A and phosgene or a phosgene analog such as trichloromethylchloroformate, triphosgene or diphenylcarbonate, in the last mentioned case by condensation, usually by addition of a suitable transesterification catalyst, such as a boron hydride, an amine such as 2-methylimidazole or a quaternary ammonium salt. In addition to bisphenol A, other additional bisphenol components may be used, and also monomers which may be halogenated in the benzene nucleus. Particularly suitable bisphenol components that merit mention are: 2,2-bis(4'-hydroxyphenyl) propane (bisphenol A), 2,4'-dihydroxydiphenylmethane, bis (2-hydroxyphenyl)methane, bis-(4-hydroxyphenyl) methane, bis(4-hydroxy-5-propylphenyl)methane, 1,1-bis (4'-hydroxyphenyl)ethane, bis(4-hydroxyphenyl) cyclohexylmethane, 2,2-bis(4'-hydroxyphenyl)-1-phenylpropane, 2,2-bis(3',5'-dimethyl-4'-hydroxyphenyl) propane, 2,2-bis(3', 5'-dibromo-4'-hydroxyphenyl)propane, 2,2-bis(3',5'-dichloro-4'-hydroxyphenyl)propane, 1,1-bis-(4'-hydroxyphenyl) cyclododecane, 1,1-bis(3',5'-dimethyl-4'-hydroxyphenyl)cyclododecane, 1,1-bis(4'-hydroxyphenyl)-3,3,5-trimethylcyclohexane, 1,1-bis(4'-hydroxyphenyl) 3,3,5,5-tetramethylcyclohexane, 1,1-bis(4'-hydroxyphenyl)-3,3,5-trimethylcyclopentane and the bisphenols indicated above. Furthermore, the polycarbonates may also be branched by suitable amounts of more than difunctional monomers (examples are as indicated above).

In addition to blends of PES and PC, i.e. in particular PBT/PC and PET/PC, suitable blends according to this invention are also ternary blends such as PBT/PC/ABS, PBT/PET/PC, PBT/PET/PC/ABS or PBT/PC/ASA blends.

The blends are prepared in customary manner from the starting polymers. The PES component is preferably PBT and the PC component is preferably a PC based on bisphenol A. The ratio of PES to PC is preferably from 95:5 to 5:95. Most preferred is a ratio in which one component constitutes at least 70%.

The transesterification reactions result in all PES/PC blends containing a lesser or greater amount of block copolymer structures, i.e. one part of the blends is in the form of a PC/PES block copolymer. The inventive enhancement of the properties increases the compatibility of the polymers with one another. However, it is also possible to increase the compatibility with so-called compatibilisers. In the present case these may typically be polyester/polycarbonate copolymers, but also polyarylates (=aromatic polyesters).

The PES/PC recyclates may also contain minor amounts of other polymers as impurities, for example polyolefms, polyurethanes, ABS or PVC. Furthermore, these recyclates may also contain standard impurities, such as dye residues, paint residues, metal traces, fuel residues and inorganic salts.

If component a) is an inorganic compound of the series of the metal oxides, then these are preferably metal oxides of the elements of the 2nd main group and 2nd, 4th and 7th auxiliary groups. Further preferred metals are calcium, magnesium, zinc, titanium and manganese; CaO, MgO or ZnO being particularly preferred. Calcium oxide is most preferred.

It is also possible to use a mixture of different metal oxides for component a).

If component a) is a metal salt of a fatty acid (metal soap), then the metal is preferably an element of the 2nd main or auxiliary group, or aluminium or tin.

Said salts are preferably zinc, magnesium, aluminium, tin or, more particularly, calcium salts of the series of the aliphatic saturated $C_2$–$C_{22}$carboxylates, the aliphatic olefinic $C_3$–$C_{22}$carboxylates, the aliphatic $C_2$–$C_{22}$carboxylates which are substituted by at least one OH group, the cyclic or bicyclic $C_5$–$C_{22}$carboxylates, the aromatic $C_7$–$C_{22}$carboxylates, the aromatic $C_7$–$C_{22}$carboxylats which are substituted by at least one OH group, the $C_1$–$C_{16}$alyl-substituted phenylcarboxylates and the phenyl-$C_1$–$C_{16}$alkylcarboxylates, preferably stearates, laurates, behenates, laevulinates, citrates, lactates or thioglycolates.

Very particularly preferred metals soaps are calcium stearate, magnesium stearate, aluminium stearate, zinc stearate, calcium lactate or calcium laurate.

It is also possible to use a mixture of different metal soaps for component a). Component a) may typically be a mixture of calcium laurate and calcium stearate, or of zinc stearate and calcium stearate; but a mixture of metal oxides or metal soaps, such as calcium oxide or calcium stearate, is also possible.

Based on 100 parts of PES/PC blend, 0.01–10 parts, preferably 0.05–1 part, of component a) are used.

Component $b_1$) is a combination of at least one phosphite and at least one sterically hindered phenol.

The organic phosphites which may be used in accordance with this invention are known as stabilisers for plastics. They are preferably used as processing stabilisers for polyolefins.

The phosphites to be used according to this invention are typically those of formula

(III)

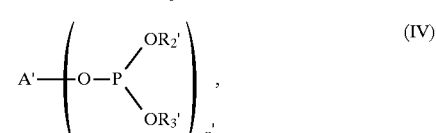

(IV)

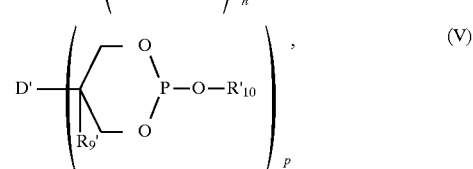

(V)

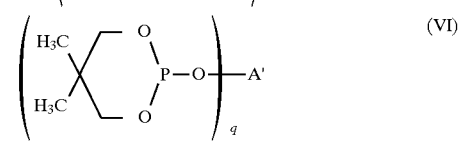

(VI)

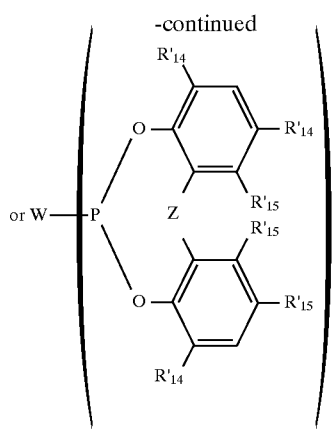

(VII)

wherein

R'$_1$, R'$_2$ and R'$_3$ are each independently of one another alkyl of 1 to 18 carbon atoms, alkyl of 1 to 18 carbon atoms which is substituted by halogen, —COOR'$_4$, —CN or —CONR'$_4$R'$_4$; alkyl of 2 to 18 carbon atoms which is interrupted by —S—, —O— or —NR'$_4$—; cycloalkyl of 5 to 8 carbon atoms, phenyl or naphthyl; phenyl or naphthyl, each of which is substituted by halogen, 1 to 3 alkyl radicals or alkoxy radicals containing a total of 1 to 18 carbon atoms; 2,2,6,6-tetramethylpiperid-4-yl, N-allyl- or N-benzyl- or N-alkyl-2,2,6,6-tetramethyl-piperid-4-yl containing 1 to 4 carbon atoms in the alkyl moiety, or N-alkanoyl-2,2,6,6-tetramethylpiperid-4-yl containing 1 to 4 carbon atoms in the alkyl moiety, or N-alkylene-2,2,6,6-tetramethylpiperidyl or N-alkylene-4-alkoxy-2,2,6,6-tetramethylpiperidyl containing 1 to 3 carbon atoms in the alkylene moiety and 1 to 18 carbon atoms in the alkoxy moiety, each R'$_4$ is independently hydrogen, alkyl of 1 to 18 carbon atoms, cycloalkyl of 5 to 12 carbon atoms, or phenylalkyl containing 1 to 4 carbon atoms in the alkyl moiety, n' is 2, 3 or 4, A', if n' or q=2, is alkylene of 2 to 12 carbon atoms, alkylene of 2 to 12 carbon atoms which is interrupted by —S—, —O— or —NR'$_4$—, wherein R'$_4$ has the given meaning, or a radical of formula

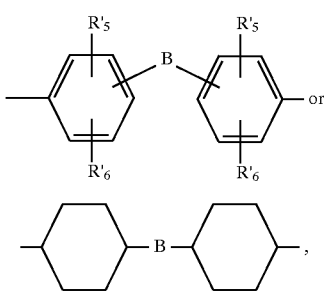

A', if n' or q=3, is a radical of formula —C$_r$H$_{2r-1}$— or N(CH$_2$CH$_2$)$_3$, wherein r is 5 or 6, A', if n'=4, is the radical of formula C(CH$_2$)$_4$, R$_5$ and R$_6$ are each independently of the other hydrogen or alkyl of 1 to 8 carbon atoms, B is a radical of formula —CH$_2$—, —CHR'$_4$—, —CR'$_1$R'$_4$—, —S— or a direct bond, wherein R'$_1$ and R'$_4$ are as indicated, p is 1 or 2, D', if p=1, is methyl and, if p=2, is —CH$_2$OCH$_2$—, R'$_9$ is methyl, and R'$_{10}$ has the meaning of R'$_1$, q is 2 or 3, y is 1,2 or 3, W, if y=1, is alkyl of 1 to 18 carbon atoms, a radical of formula —OR'$_{16}$, —NR'$_{17}$R'$_{18}$ or fluoro, W, if y=2, is a radical of formula —O—A"—O—, or

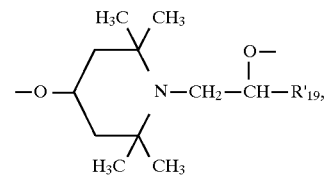

W, if y=3, is a radical of formula R'$_4$C(CH$_2$O)$_3$, N(C$_2$H$_4$O)$_3$ or N(C$_3$H$_6$O)$_3$, wherein R'$_4$ has the given meaning, R'$_{16}$ has the meaning of R'$_1$, R'$_{17}$ and R'$_{18}$ are each independently of the other alkyl of 1 to 18 carbon atoms, benzyl, cyclohexyl, a 2,2,6,6-tetra- or 1,2,2,6,6-pentamethylpiperid-4-yl radical, or R'$_{17}$ and R'$_{18}$, taken together, are butylene, pentylene, hexylene or the radical of formula —CH$_2$CH$_2$—O—CH$_2$CH$_2$—, A", if n'=2, has the meaning of A', R'$_{19}$ is hydrogen or methyl, the substituents R'$_{14}$ are each independently of one another hydrogen, alkyl of 1 to 9 carbon atoms or cyclohexyl, R'$_{15}$ is hydrogen or methyl, and Z is a direct bond, —CH$_2$—, —C(R'$_{14}$)$_2$— or —S—, wherein the substituents R'$_{14}$ are identical or different and have the indicated meaning.

Particularly suitable phosphites of formula (III) are those, wherein R'$_1$, R'$_2$ and R'$_3$ are each independently of one another alkyl of 1 to 18 carbon atoms; phenyl; phenyl which is substituted by 1 to 3 alkyl radicals containing a total of 1 to 18 carbon atoms, or 2,2,6,6-tetramethylpiperid-4-yl and, more particularly, those, wherein R'$_1$, R'$_2$ and R'$_3$ are each independently of one another phenyl which is substituted by 1 to 3 alkyl radicals containing a total of 1 to 12 carbon atoms.

Particularly suitable phosphites of formula (IV) are those, wherein A', if n'=2, is preferably alkylene of 2 to 12 carbon atoms, —CH$_2$CH$_2$—O—CH$_2$CH$_2$—, —CH$_2$CH$_2$—O—CH$_2$CH$_2$O—CH$_2$CH$_2$— or —CH$_2$CH$_2$—NR'$_4$—CH$_2$CH$_2$—, or A', if n'=3, is N(CH$_2$CH$_2$)$_3$, wherein R'$_4$ is alkyl of 1 to 4 carbon atoms.

Particularly suitable phosphites of formula (V) are those, wherein p is 1, D' is methyl, R'$_9$ is methyl and R'$_{10}$ is phenyl which is substituted by 1 to 3 alkyl radicals containing a total of 1 to 18 carbon atoms.

Particularly suitable phosphites of formula (VII) are those, wherein W, if y=1, is a radical of formula —OR'$_{16}$, —NR'$_{17}$R'$_{18}$ or fluoro, or W, if y=2, is a radical of formula —O—CH$_2$CH$_2$—NR'$_4$—CH$_2$CH$_2$—O—, or W, if y=3, is a radical of formula N(CH$_2$CH$_2$O)$_3$, wherein R'$_{16}$ is alkyl of 1 to 18 carbon atoms, R'$_{17}$ and R'$_{18}$ are each independently of the other alkyl of 1 to 18 carbon atoms, cyclohexyl or benzyl, or R'$_{17}$ and R'$_{18}$, taken together, form a piperidyl, morpholinyl or hexamethylene-imino radical, and R'$_4$ has the given meaning, Z is a direct bond, —CH$_2$— or —CHCH$_3$—, and the two substituents R'$_{14}$ are each independently of the other alkyl of 1 to 4 carbon atoms and, more particularly, W, if y=1, is 2-ethylhexyloxy or fluoro, $R'_{14}$ is tert-butyl, $R'_{15}$ is hydrogen and Z is —CH$_2$— or —CH(CH$_3$)—, or W, if y=2, is a radical of formula —O—CH$_2$CH$_2$—NCH$_3$—CH$_2$CH$_2$—O—.

Preferred phosphites are typically trilaurylphosphite, trioctadecylphosphite, distearyl pentaerythritol diphosphite or tristearyl sorbitol triphosphite.

Aromatic phosphites are also preferred. By aromatic phosphites are meant those phosphites which contain an aromatic hydrocarbon radical such as a phenyl radical. Illustrative examples are triphenylphosphite, diphenylalkylphosphites, phenyldialkylphosphites and, specifically, tris(nonylphenyl)phosphite, tris(2,4-di-tert-butylphenyl)phosphite, bis(2,4-di-tert-butylphenyl) pentaerythritoldiphosphite and 2,2'-ethylidene-bis(4,6-di-tert-butylphenyl)-fluorophosphite.

Of preeminent interest are phosphites containing as structural element the grouping P-O-Ar, wherein Ar is an aromatic radical, preferably an alkyl-substituted phenyl radical.

Suitable alkyl substituents are $C_1$–$C_{18}$alkyl radicals or also $C_5$–$C_7$cycloalkyl radicals.

$C_1$–$C_4$Alkyl radicals and, more particularly, tert-butyl (represented in the formulae by

are preferred.

The following phosphites are particularly preferred:

tris(2,4-di-tert-butylphenyl)phosphite;

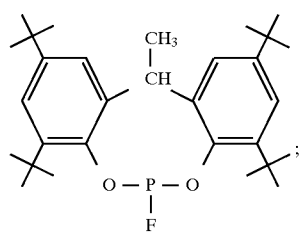

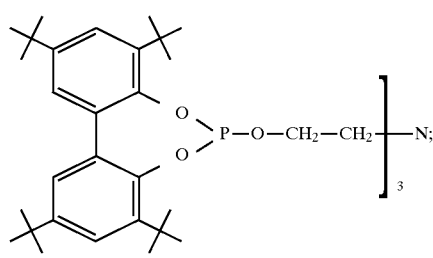

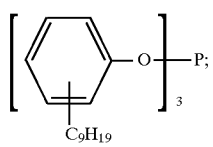

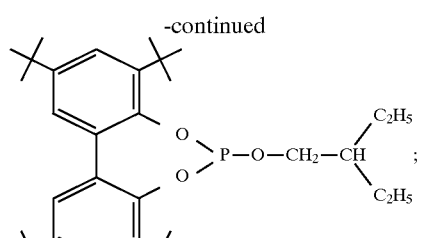

The use of tris(2,4-di-tert-butylphenyl)phosphite,

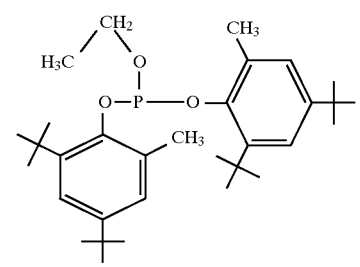

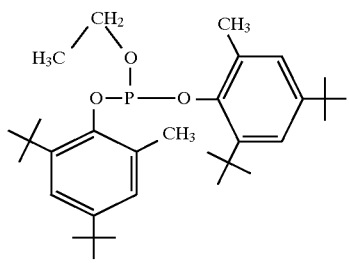

or

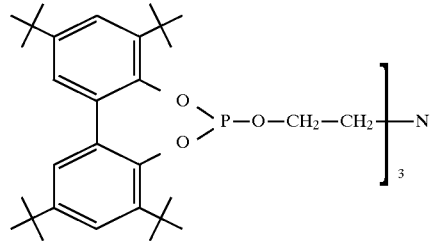

is very particularly preferred.

It is preferred to use 0.01–2 parts, more particularly 0.01–1 part, of the phosphite, based on 100 parts of PES/PC blend.

The sterically hindered phenols which may be used in accordance with this invention are likewise commonly known stabilisers against the thermal-oxidative ageing of plastics, in particular of polyolefins. Typically, the sterically hindered phenols contain at least one group of formula I

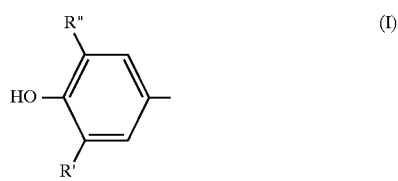

wherein R' is hydrogen, methyl or tert-butyl; and
R" is unsubstituted or substituted alkyl or unsubstituted or substituted alkylthioalkyl.

A particularly suitable sterically hindered phenol is a compound of formula II,

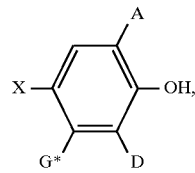
(II)

wherein

A is hydrogen, $C_1$–$C_{24}$alkyl, $C_5$–$C_{12}$cycloalkyl, phenyl—$C_1$–$C_4$alkyl, phenyl or a group —$CH_2$—S—$R_{25}$ or

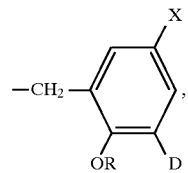

D is $C_1$–$C_{24}$alkyl, $C_5$–$C_{12}$cycloalkyl, phenyl—$C_1$–$C_4$alkyl, phenyl or a group —$CH_2$—S—$R_{25}$, X is hydrogen, $C_1$–$C_{18}$alkyl or one of the groups —$C_aH_{2a}$—$S_q$—$R_{26}$, —$C_bH_{2b}$—CO—O$R_{27}$, —$C_bH_{2b}$—CO—N($R_{29}$)($R_{30}$), —$CH_2$N($R_{34}$)($R_{35}$),

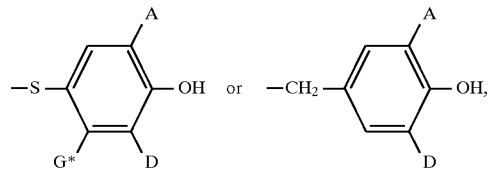

R is hydrogen or a group of formula —CO—CH=$CH_2$,

G* is hydrogen or $C_1$–$C_{12}$alkyl, $R_{25}$ is $C_1$–$C_{18}$alkyl, phenyl or a group —$(CH_2)_c$—CO—O$R_{28}$ or —$CH_2CH_2OR_{33}$, $R_{26}$ is hydrogen, $C_1$–$C_{18}$alkyl, phenyl, benzyl or a group

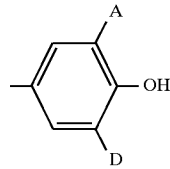

or —$(CH_2)_c$—CO—O$R_{28}$ or —$CH_2$—$CH_2$—O$R_{33}$, $R_{27}$ is $C_1$–$C_{30}$alkyl or one of the groups —CHR$_{31}$—$CH_2$—S—$R_{32}$,

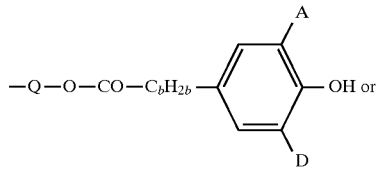

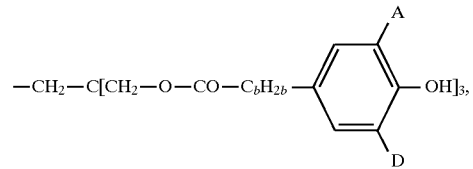

wherein Q is $C_2$–$C_8$alkylene, $C_4$–$C_6$thiaalkylene or a group —$CH_2CH_2(OCH_2CH_2)_d$—, $R_{28}$ is $C_1$–$C_{24}$alkyl, $R_{29}$ is hydrogen, $C_1$–$C_{18}$alkyl or cyclohexyl, $R_{30}$ is $C_1$–$C_{18}$alkyl, cyclohexyl, phenyl; $C_1$–$C_{18}$alkyl-substituted phenyl, or one of the groups or $R_{29}$ and $R_{30}$, taken together, are $C_4$–$C_8$alkylene which may be interrupted by —O— or —NH—, $R_{31}$ is hydrogen, $C_1$–$C_4$alkyl or phenyl, $R_{32}$ is $C_1$–$C_{18}$alkyl, $R_{33}$ is hydrogen, $C_1$–$C_{24}$alkyl, phenyl, $C_2$–$C_{18}$alkanoyl or benzoyl, $R_{34}$ is $C_1$–$C_{18}$alkyl, cyclohexyl, phenyl, $C_1$–$C_{18}$alkyl-substituted phenyl, or a group

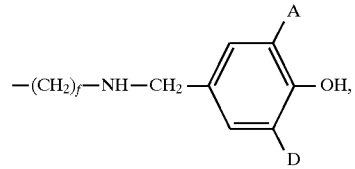

$R_{35}$ is hydrogen, $C_1$–$C_{18}$alkyl, cyclohexyl or a group

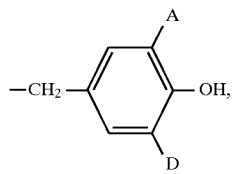

or $R_{34}$ and $R_{35}$, taken together, are $C_4$–$C_8$alkylene which may be substituted by —O— or —NH—, a is 0, 1, 2 or 3, b is 0, 1, 2 or 3, c is 1 or 2, d is 1 to 5, f is 2 to 8, and q is 1, 2, 3 or 4.

A preferred compound of formula II is that, wherein

A is hydrogen, $C_1$–$C_8$alkyl, cyclohexyl, phenyl or a group —CH$_2$—S—$C_1$–$C_{18}$alkyl or

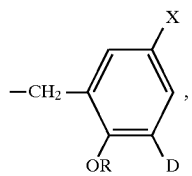

D is $C_1$–$C_8$alkyl, cyclohexyl, phenyl or a group —CH$_2$—S—$C_1$–$C_{18}$alkyl, X is hydrogen, $C_1$–$C_8$alkyl or one of the groups —$C_aH_{2a}$—$S_q$—$R_{26}$, —$C_bH_{2b}$—CO—OR$_{27}$, —CH$_2$N($R_{34}$)($R_{35}$),

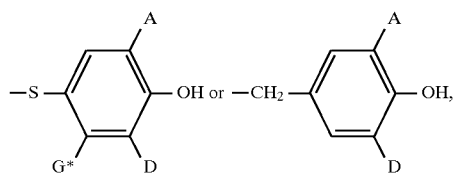

$R_{26}$ is $C_1$–$C_{12}$alkyl, phenyl or a group —(CH$_2$)$_c$—CO—OR$_{28}$, $R_{27}$ is $C_1$–$C_{18}$alkyl or a group

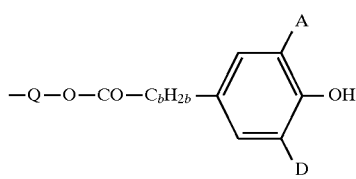

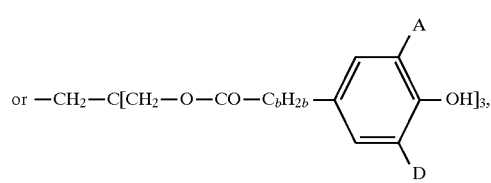

wherein Q is $C_2$–$C_8$alkylene, —CH$_2$—CH$_2$—S—CH$_2$CH$_2$ or a group —CH$_2$CH$_2$(OCH$_2$CH$_2$)$_d$—, $R_{28}$ is $C_1$–$C_{18}$alkyl, $R_{34}$ and $R_{35}$ are each independently of the other hydrogen or $C_1$–$C_{12}$alkyl, or $R_{34}$ and $R_{35}$, taken together, are $C_4$–$C_8$alkylene which may be interrupted by —O— or —NH—, a is 1 or 2, b is 1 or 2, c is 1 or 2, and d is 1, 2 or 3.

Illustrative examples of preferred sterically hindered phenols are:

2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,6-di-tert-butyl-4-methoxyphenol, 2,5-di-tert-butylhydroquinone, 2,5-di-tert-amyl-hydroquinone, 2,6-diphenyl-4-octadecyloxyphenol, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methyl-phenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl) butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methyl-phenyl]terephthalate, 1,3,5-tris(3,5-di-tert-butyl-4-hydroxybenzyl)-2d4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydrox-2,6-dimethylbenzyl) dithiolterephthalate, 1,3,5-tris(3,5-di-tert-butyl4-hydroxybenzyl) isocyanurate, 1,3,5-tris(4-tert-butyl-3-hydroxy-2,6-dimethylbenzyl)-isocyanurate, dioctadecyl 3,5-di-tert-butyl-4-hydroxybenzylphosphonate and the calcium salt of monoethyl 3,5-di-tert-butyl-4-hydroxybenzyl-phosphonate.

Particularly preferred sterically hindered phenols are compounds containing at least one group of formula

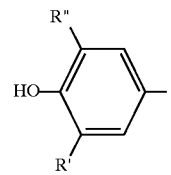

(I)

wherein R' is methyl or tert-butyl; and

R" is unsubstituted or substituted alkyl or unsubstituted or substituted alkylthioalkyl.

Illustrative examples of such sterically hindered phenols are: the esters of β-(3,5-di-tert-butyl-4-hydroxyphenyl) propionate and of β-(5-tert-buty-4-hydroxy-3-methylphenyl) propionate with mono- or polyhydric alcohols, such as methanol, octanol, octadecanol, 1,6-hexanediol, neopentyl glycol, thiodiethylene glycol, diethylene glycol, triethylene glycol, pentaerythritol, tris(hydroxyethyl)isocyanurate, N,N'-bis(hydroxyethyl) oxamide, as well as the amides of these acids, such as N,N'-bis(3,5-di-tert-butyl-4-hydroxyphenylpropionyl) hexamethylenediamine, N,N'-bis(3,5-di-tert-butyl-4-hydroxyphenylpropionyl) trimethylenediamine and N,N'-bis(3,5-di-tert-butyl-4-hydroxyphenylpropionyl)hydrazine.

Further particularly preferred compounds are:

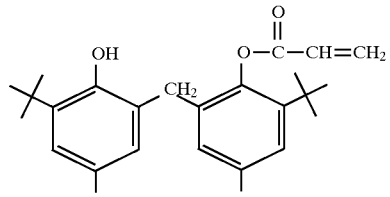
{2-(1,1-dimethylethyl)-6-[[3-(1,1-dimethylethyl)-2-hydroxy-5-methylphenyl]methyl]-4-methylphenyl 2-propenoate};

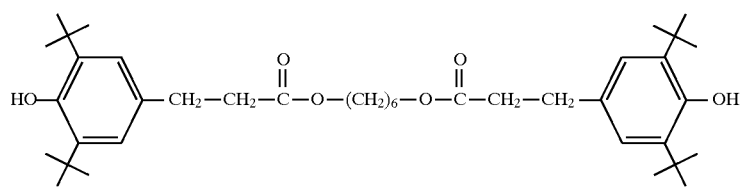
{1,6-hexandiyl 3-5-bis(1,1-dimethyl-ethyl)-4-hydroxyphenylpropanoate};

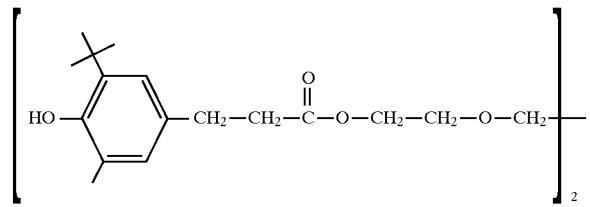
{1,2-ethanediylbis(oxy-2,1-ethanediyl) 3-(1,1-dimethylethyl)-4-hydroxy-5-methyl-phenylpropanoate};

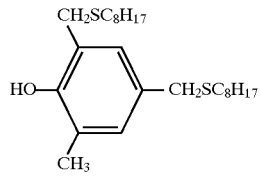
{2-methyl-4,6-bis[(octylthio)methyl]-phenol};

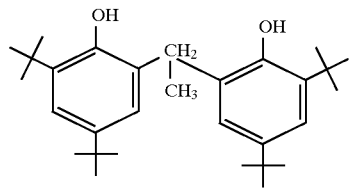
{2,2'-ethylidenebis(4,6-di-tert-butylphenol)};

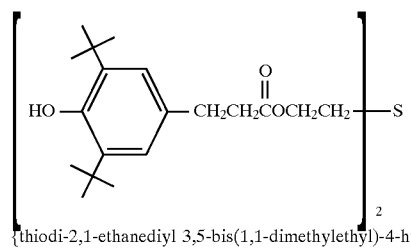
{thiodi-2,1-ethanediyl 3,5-bis(1,1-dimethylethyl)-4-hydroxyphenylpropanoate};

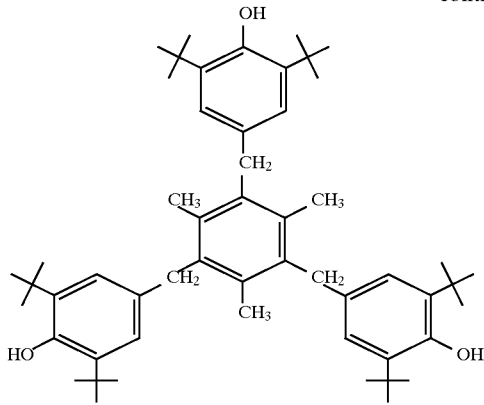

{4,4',4"-[2,4,6-trimethyl-1,3,5-phenyltriyl)-tris(methylene)]tris[2,6-bis(1,1-dimethylethyl)phenol];

Very particularly preferred sterically hindered phenols are the pentaerythrityl, octyl and the octadecyl ester of β-(3,5-di-tert-butyl-4-hydroxyphenyl)propionic acid.

It is prefer-red to use 0.01–3 parts, more particularly 0.01–1part, of the sterically hindered phenol, based on 100 parts of PES/PC blend.

Furthermore, it is preferred to use as component $b_1$) a mixture of phosphite and sterically hindered phenol in the ratio from 1:10 to 10:1, most preferably in the ratio from 1:4 to 4:1.

The difunctional epoxy resins which may be used as component $b_2$) according to this invention may have an aliphatic, aromatic, cycloaliphatic, araliphatic or heterocyclic structure. They contain epoxy groups as side groups or these groups form part of an alicyclic or heterocyclic ring system. The epoxy groups are preferably linked to the residual molecule as glycidyl groups through ether or ester bonds, or they are N-glycidyl derivatives of heterocyclic amines, amides or imides. Epoxy resins of these types are commonly known and commercially available.

The epoxy resins contain two epoxy radicals, typically those of formula X

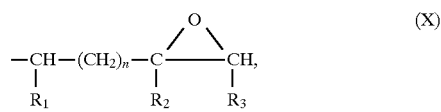

which radicals are linked direct to carbon, oxygen, nitrogen or sulfur atoms, wherein $R_1$ and $R_3$ are both hydrogen, $R_2$ is hydrogen or methyl, and n=0, or wherein $R_1$ and $R_3$, taken together, are —$CH_2$—$CH_2$— or —$CH_2$—$CH_2$—$CH_2$—, in which case $R_2$ is hydrogen and n=0 or 1.

Illustrative examples of epoxy resins are:

I) Diglycidyl and di(β-methylglycidyl) esters which are obtainable by reacting a compound containing two carboxyl groups in the molecule and epichlorohydrin or glycerol dichlorohydrin or β-methyl epichlorohydrin. The reaction is conveniently carried out in the presence of a base.

Compounds containing two carboxyl groups in the molecule may suitably be aliphatic dicarboxylic acids. Exemplary of these dicarboxylic acids are glutaric acid, adipic acid, pimelic acid, suberic acid, azelaic acid, sebacic acid or dimerised or trimerised linoleic acid.

Cycloaliphatische dicarboxylic acids may also be used, for example tetrahydrophthalic acid, 4-methyltetrahydrophthalic acid, hexahydrophthalic acid or 4-methylhexahydrophthalic acid.

Aromatic dicarboxylic acids may also be used, including phthalic acid or isophthalic acid.

II) Diglycidyl or di(β-methylglycidyl) ethers which are obtainable by reacting a compound containing two free alcoholic hydroxyl groups and/or phenolic hydroxyl groups in the molecule with a suitably substituted epichlorohydrin under alkaline conditions or in the presence of an acid catalyst and sub sequent treatment with an alkali.

Ethers of this type are typically derived from acyclic alcohols such as ethylene glycol, diethylene glycol and higher poly(oxyethylene) glycols, 1,2-propanediol, or poly (oxypropylene) glycols, 1,3-propanediol, 1,4-butanediol, poly(oxytetramethylene) glycols, 1,5-pentanediol, 1,6-hexanediol, sorbitol, as well as from polyepichlorohydrins.

They may also be derived from cycloaliphatic alcohols such as 1,3- or 1,4-dihydroxycyclohexane, bis(4-hydroxycyclohexyl)methane, 2,2-bis(4-hydroxycyclohexyl) propane or 1,1-bis(hydroxymethyl)cyclohex-3-ene, or they contain aromatic nuclei, such as N,N-bis(2-hydroxyethyl) aniline or p,p'-bis(2-hydroxyethylarino)diphenylmethane.

The epoxy resins may also be derived from mononuclear phenols, as from resorcinol, 1,2-benzenediol or hydroquinone, or they are based on polynuclear phenols such as 4,4'-dihydroxybiphenyl, bis(4-hydroxyphenyl) methane, 2,2-bis(4-hydroxyphenyl)propane, 2,2-bis(3,5-dibromo-4-hydroxyphenyl)propane, 4,4'-dihydroxydiphenylsulfone, or 9,9-bis-(4-hydroxyphenyl) fluorene, or on condensates of phenols with formaldehyde which are obtained under acid conditions, for example phenol novolaks.

III) Bis(N-glycidyl) compounds, obtainable typically by dehydrochlorination of the reaction products of epichaoro-hydrin with amines which contain two amino hydrogen atoms. These amines are typically aniline, toluidine, n-butylanine, bis(4-aminophenyl) methane, m-xylyenediamine or bis(4-methylaminophenyl)methane.

The bis(N-glycidyl) compounds, however, also include N,N'-diglycidyl derivatives of cycloalkylene ureas such as ethyleneurea or 1,3-popyleneurea, and N,N'-diglycidyl derivatives of hydantoins, typically of 5,5-dimethylhydantoin.

IV) Bis(S-glycidyl) compounds, typically bis(S-glycidyl) derivatives that are derived from dithiols such as 1,2-ethanedithiol or bis(4-mercaptomethylphenyl) ether.

V) Epoxy resins containing a radical of formula X, wherein $R_1$ and $R_3$ together are —$CH_2$—$CH_2$- and n is 0, typically bis(2,3-epoxycyclopentyl) ether, 2,3-epoxycyclopentylglycidyl ether or 1,2-bis(2,3-epoxycyclopentyloxy) ethane. Epoxy resins containing a radical of formula X, wherein $R_1$ and $R_3$ together are —CH$_2$—CH$_2$—and n is 1, is typically 3,4-epoxy-6-methylcyclohexyl-3',4'-epoxy-6-methylcyclohexanecarboxylate.

By reason of the preparative process, the above-mentioned difunctional epoxy resins may contain minor amounts of mono- or trifunctional groups.

Furthermore, trifunctional or higher-functional epoxy resins may also be used, typically triglycidylisocyanurate, trimellitic acid triglycidyl ester or

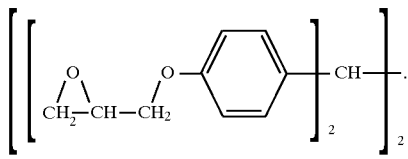

Diglycidyl compounds of aromatic structure are mainly used.

It is also possible to use a mixture of epoxy resins of different structure.

Particularly preferred difunctional epoxy resins are diglycidyl ethers of bisphenols, typically 2,2-bis(4-hydroxyphenyl)propane (bisphenol A), bis(4-hydroxyphenyl)sulfone (bisphenol S) or mixtures of bis (ortho-/para-hydroxyphenyl)methane (bisphenol F).

Epoxy resins of the diglycidyl ether of bisphenol A type (especially having a softening temperature higher than 25° C.) are very particularly preferred, e.g. Araldit® GT 6071, GT 6084, GT 7071, GT 7072, GT 6097 and GT 6099. Further compounds which are particularly preferred are, besides the diglycidyl ethers of bisphenol A, diglycidyl terephthalate, diglycidyl ether of bisphenol F, e.g. Araldit® GY 281 and PY 306, diglycidyl isophthalate, triglycidyl trimellate and

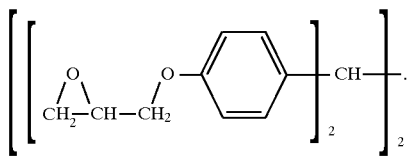

Based on 100 parts of PES/PC blend, 0.01–5 parts, more particularly 0.02–2 parts and, most preferably, 0.05–1 part, of the difunctional epoxy resins are used.

Preferred PES/PC blends comprise a combination of components a), b$_1$) and b$_2$). Component b$_2$) is preferably a diglycidyl ether of bisphenol A. Another preferred combination is that comprising as component a) calcium oxide and calcium stearate and, as component b$_2$), a diglycidyl ether of bisphenol A. A very particularly preferred combination is that comprising as component a) calcium oxide and calcium stearate and, as component b$_1$), tris(2,4-di-tert-butylphenyl) phosphite and the pentaerythrityl ester of the β-(3,5-di-tert-butyl-4-hydroxyphenyl)propionic acid and, as component b2), a diglycidyl ether of bisphenol A.

To 100 parts of PES/PC blend are usually added 0.01–10 parts and, preferably 0.05–1 part, of component a), 0.02–5 parts, preferably 0.02–2 parts and, most preferably 0.05–1 part, of component b$_1$), and/or 0.01 to 5 parts, preferably 0.02–2 parts and, most preferably 0.05–1 part, of component b$_2$). The amount of the components a), b$_1$) and/or b$_2$) is determined in this case by the starting molecular weight of the polymer and by the desired final molecular weight, or whether a processing stability is desired.

In addition to components a), b$_1$) and/or b$_2$) further stabilisers may be added to the PES/PC blend. These further stabilisers are known to the skilled person and are selected according to the specific demands made of the end product. In particular, it is possible to add light stabilisers or also antioxidants or additional antioxidants ("Plastics Additives Handbook", Ed. R. Gächter and H. Müller, Hanser Verlag, 3rd edition, 1990; in particular pages 88/89, 92/94, 251/252 and 258/259). Likewise it is possible to add further modifiers, such as adhesion promoters, pigments, dyes, fluorescent whitening agents, nucleating agents, slip agents, mould release agents, fillers or reinforcing agents such as glass fibres, glass beads, talcum, silica, carbon black, impact strength improvers, flame retardants, antistatic agents and, especially for PBT/PC, modifiers that prevent transesterification during processing, for example aromatic phosphates.

Particularly suitable stabilisers include:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-dido-decylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4 Chroman derivatives of formula

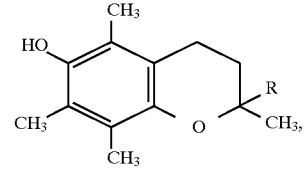

wherein R is —(CH$_2$)$_3$—CH(CH$_3$)—(CH$_2$)$_3$—CH(CH$_3$)—(CH$_2$)$_3$—CH—(CH$_3$)$_2$ or —CH$_2$—CH$_2$—O—C(O)—Z, and Z is C$_{1-C18}$alkyl, —CH$_2$—CH$_2$—S—C$_1$-C$_{18}$alkyl or

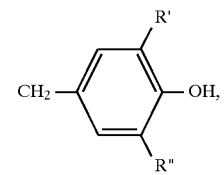

and R' or R" are hydrogen, methyl or tert-butyl, e.g. α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis (6-tert-butyl-2-methylphenol), 4,4'-thiobis(3,6- di-sec-amylphenol), 4,4'-bis(2,6-dimethyl-4-hydroxyphenyl) disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl) phenol], 2,2'-methylenebis(4-methyl-6-cyclohexylphenol), 2,2'-methylenebis (6-nonyl4-methylphenol), 2,2'-methylenebis(4,6-di-tert-butylphenol), 2,2'-ethylidenebis (4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl4-hydroxy-2-methylphenyl) butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl) butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl) malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto4,6bis(3,5-di-tert-butyl -4-hydroxyphenoxy)-1,3,5-triazine, 2,4,6-tris (3,5-di-tert-butyl-4-hydroxyphenoxy)-1,2,3-triazine, 1,3,5-tris-(3 ,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3 ,5-di-tert-butyl-4-hydroxyphenylpropionyl)hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1. 13. Esters of β-(3,5-di-tert-butyl-4-hydroxyphenyl) propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexy-4-hydroxyphenyl) propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethyl hexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-ditert-butyl-4-hydroxyphenylpropionyl)hexamethylenediamine, N,N'-bis (3,5-di-tert-butyl-4-hydroxyphenylpropionyl) trimethylenediamine, N,N'-bis(3,5-di-tert-butyl-4-hydroxyphenylpropionyl)hydrazine.

The preferred antioxidants in this case are those described further above for component $b_1$.

2. UV absorbers and light stabilisers 2.1.2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2',-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl) benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2',-hydroxy-5'-(2-methoxycarbonylethyl)phenyl)benzotriazole, 2-(3'-tert-butyl-2'-hydroxy-5'-(2-octyloxycarbonylethyl) phenyl)benzotriazole, 2-(3'-tert-butyl-5'-[2-(2-ethylhexyloxy)carbonylethyl]- 2'-hydroxyphenyl) benzotriazole, 2-(3'-dodecyl-2'-hydroxy-5'-methylpheny,) benzotriazole, and 2-(3'-tert-butyl-2'-hydroxy-5'-(2-isootyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$—)$_3$]$_2$, where R=(3'-tert-butyl-4'-hydroxy-5'-2H-benzotriazol-2-yl)phenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tert-butylphenyl salicylate, phenyl salicylate, octyiphenyl salicylate, dibenzoyl resorcinol, bis (4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-,β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-βcyanovinyl)-2-methylindoline.

2.5. Nickel compounds, for example nickel complexes of 2,2'-thiobis[4-(1,1,3,3-tetramethylbutyl) phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-piperidyl)sebacate, bis(2,2,6,6-tetramethyl-piperidyl)succinate, bis(1,2,2,6,6-pentamethylpiperidyl) sebacate, bis(1,2,2,6,6-pentamethylpiperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-pipernidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl7,7,9,9-tetramethyl-1,3, 8-triazasprio[4.5]decane-2,4-dione, bis(1-octyloxy-2,2,6,6-tetramethylpiperidyl) sebacate, bis(1-octyloxy-2,2,6,6-tetramethylpiperidyl) succinate, the condensate of N,N'-bis(2,2,6,6-tetramethyl-4-piperidyl)hexamethylenediamine and 4-morpholino-2,6-dichloro-1,3,5-triazine, the condensate of 2-chloro-4,6-bis (4-n-butylamino-2,2,6,6-tetramethylpiperidyl )-1,3,5-triazine and 1,2-bis(3-aminopropylamino)ethane, the condensate of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione.

2.7. Oxamides, for example 4,4'-dioctyloxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis (3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and paramethoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2, 4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)-thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)pentaerythritol diphosphite, bis(isodecyloxy) pentaerythritol diphosphite, bis(2,4-di-tert-butyl-6-methylphenyl)pentaerythritol diphosphite, bis(2,4,6-tris (tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8, 10-tetra-tert-butyl-12H-dibenz[d,g]-1,3,2-dioxaphosphocin, 6-fluoro-2,4,8,10-tetra-tert-butyl-12-methyl-dibenz[d,g]-1, 3,2-dioxaphosphocin, bis(2,4-di-tert-butyl-6-methylphenyl) methylphosphite, bis(2,4-di-tert-butyl-6-methylphenyl) ethylphosphite.

5. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

6. Polyamide stabilisers, for example, copper salts in combination with iodides and/or phosphorus compounds and salts of divalent manganese.

7. Basic co-stabilisers, for example, melamine, polyvinylpyrrolidone, dicyandiamide, triallyl cyanurate, urea derivatives, hydrazine derivatives, amines, polyamides, polyurethanes.

8. Nucleating agents, for example, 4-tert-butylbenzoic acid, adipic acid, diphenylacetic acid, sodium benzoate and aluminium-bis-4-(1,1-dimethylethyl)benzoatehydroxide.

9. Fillers and reinforcing agents, for example, silicates, glass fibres, talc, kaolin, mica, barium sulfate, metal oxides and hydroxides, carbon black, graphite.

10. Other additives, for example, plasticisers, lubricants, emulsifiers, pigments, such as titanium dioxide, optical brighteners, flameproofing agents, antistatic agents and blowing agents.

11. Benzofuranones and indolinones, for example those disclosed in U.S. Pat. No. 4,325,863, U.S. Pat. No. 4,338, 244 or U.S. Pat. No. 5,175,312, U.S. Pat. No. 5,216,052, U.S. Pat. No. 5,252,643, DE-A-4 316 611, DE-A-4 316 622, DE-A-4 316 876, EP-A-0 589 839 or EP-A-0 591 102, or 3-[4-(2-acetoxyethoxy) phenyl]-5,7-di-tert-butyl-benzofuran-2-one, 5,7-di-tert-butyl-3-[4-(2-stearoyloxyethoxy) phenyl]benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl4-pivaloyloxyphenyl)-5, 7-di-tert-butyl-benzofuran-2-one.

The preferred light stabilisers are those of the classes 2.1, 2.6 and 2.7 such as light stabilisers of the Chimassorb 944, Chimassorb 119, Tinuvin 234, Tinuvin 312, Tinuvin 622 or Tinuvin 770 type. The aromatic phosphites or phosphonites described above for component $b_1$ are also preferred.

If the polyester/polycarbonate blend is a recyclate, then the blend can also be used in admixture with virgin material or together with virgin material, for example in a coextrusion process. These mixtures will be understood as comprising mixtures of, for example, a polyester recyclate with PC virgin material or polyester virgin material and PC recyclate, or the addition of PC virgin material or polyester virgin material to a polyester/PC recyclate blend.

Further additives to be mentioned are catalysts customarily used for the curing of epoxy resins, for example carboxylic acid anhydrides, polyamines, polythiols, tertiary amines.

The present invention also relates to the use of a mixture comprising a) at least one metal oxide or metal salt of a fatty acid, and $b_1$) at least one phosphite and at least one sterically hindered phenol, or $b_2$) at least one difunctional epoxy resin, or a combination of $b_1$) and $b_2$) for enhancing the properties of PES/PC blends and, more particularly, of PES/PC recyclates, using 0.01–10 parts of component a) per 100 parts of PES/PC blend. The preferred embodiments of the use correspond to those of the PES/PC blend.

The invention also relates to a process for enhancing the properties of PES/PC blends or of PES/PC recyclates, which comprises heating the PES/PC blend, with the addition of a) at least one metal oxide or metal salt of a fatty acid and, $b_1$) at least one phosphite and at least one sterically hindered phenol, or $b_2$) at least one difunctional epoxy resin, or a combination of $b_1$) and $b_2$), to above the melting point of the PES/PC blend, using 0.01–10 parts of component a) per 100 parts of PES/PC blend. The preferred embodiments of the process correspond to those of the PES/PC blend.

The process can be carried out in any heatable container equipped with a stirrer. The process is preferably carried out in an extruder or in a kneader. It is immaterial whether processing takes place in an inert atmosphere or in the presence of oxygen.

The PES/PC blend to be heated and the components a), $b_1$) and/or $b_2$) are usually put into the apparatus when heating is started. However, a later addition is also possible, either by adding the component mixture or the individual components in any order. For this addition, the components a), $b_1$) and/or $b_2$) may be each independently of one another in the form of powder, liquid, granules or in compacted form or also on a substrate such as silica gel, or together with a polymer powder or wax, e.g. a polyethylene wax, but also in the form of a masterbatch. Heating to above the melting point is usually effected with stirring, until the components are homogenised. The temperature is governed by the PES/PC blend employed. Processing is preferably carried out in the temperature range from melting point to c. 50° C. above the melting point. A suitable temperature range for PBT/PC is typically from 220° to 300° C., preferably from 230° to 280° C.

The invention is illustrated by the following non-limitative Examples in which and in the remainder of the description, unless otherwise stated, parts and percentages are by weight.

EXAMPLES 1–3

(Table 1)

A PBT/PC blend (Pocan, sold by Bayer) is kneaded at 235° C. over a period of 15 min at 46 rpm in an oil-heated mixing chamber (Brabender) and the melt flow rate (MFR) is then determined at 250° C./2.16 kg in accordance with ISO 1133.

TABLE 1

|  | Addition of metal oxide or metal soap | Addition of phenol and phosphite | Addition of epoxy resin | MFR [g/10 min] |
| --- | --- | --- | --- | --- |
| Comparison 1 | — | — | — | 10.9 |
| Comparison 2 | — | — | 2% of Araldit GT 6071 | 12.8 |
| Comparison 3 | 1.0% of Ca oxide | — | — | 14.4 |
| Comparison 4 | 0.5% of Mg stearate | — | — | 20.8 |
| Example 1 | 0.5% of Mg stearate | — | 2% of Araldit GT 607 1 | 3.9 |
| Example 2 | 0.5% of Mg stearate | — | 1% of Araldit GT 607 1 | 8.8 |
| Example 3 | 0.5% of Ca oxide | — | 1% of Araldit GT 607 1 | 8.5 |

EXAMPLES 4–7

(Table 2)

A PBT/PC grinding stock (from partially lacquered car bumpers) is extruded 5 times on a twin-screw extruder at 230° C. and 100 rpm at 2 kg/h to simulate compounding and processing, and the MFR value is determined according to ISO 1133 (MFR before beginning: 8.5 (250° C./2.16 kg)).

TABLE 2

|  | Addition of metal oxide or metal soap | Addition of phenol and phosphite | Addition of epoxy resin | MFR after 5 extrusions [g/10 min] |
| --- | --- | --- | --- | --- |
| Comparison 5 | — | — | — | 11.3 |
| Comparison 6 | — | 0.2% of Irganox B 225 | 0.5% of Araldit GT 6071 | 17.0 |
| Example 4 | 0.2% of Ca oxide | 0.2% of Irganox B 225 | — | 8.7 |
| Example 5 | 0.2% of Ca oxide | 0.2% of Irganox B 225 | 0.50% of Araldit GT 6071 | 4.2 |
| Example 6 | 0.2% of Ca oxide | 0.2% of Irganox B 225 | 0.25% of Araldit GT 6071 | 7.9 |
| Example 7 | 0.2% of Ca oxide | 0.2% of Irganox B 225 | 1.0% of Araldit GT 6071 | 6.7 |

EXAMPLES 8–11

In general accordance with the Examples 4–7, a predried (80° C., vacuum, overnight) PBT/PC or PC/PBT blend is extruded on a twin-screw extruder ZSK 25, supplied by Werner and Pfleiderer, at 260° C. and 100 rpm with vacuum degassing, and the MFR (260° C., 2.16 kg) and the mechanical properties are then determined.

TABLE 3

| Production waste (non-lacquered car bumpers; PBT/PC blend) | | |
| --- | --- | --- |
|  | MFR [g/10 min] | Tensile strength DIN 53455 [N/mm²] |
| Comparison 7 (no addition) | 12.3 | 43.2 |
| Example 8: | | |
| 0.20% of blend AD 0.50% of Araldit GT 6071 | 8.2 | 43.9 |
| Example 9: | | |
| 0.20% of blend AD 1.00% of Araldit GT 6071 | 6.3 | 45.2 |

EXAMPLE 10

PC/PBT scrap material (c. 80% PC), stripped by chemical/mechanical means

|  | MFR [g/10 min] | Elongation DIN 53455 [%] |
| --- | --- | --- |
| Comparison 8 (no addition) | 15.8 | 10 |
| Example 10: | | |
| 0.2% of blend AD 0.5% of Araldit GT 6071 | 11.7 | 25 |

EXAMPLE 11

PBT/PC scrap material (c. 80% PBT), stripped by chemical/mechanical means

|  | MFR [g/10 min] | Tensile strength DIN 53455 [N/mm²] |
| --- | --- | --- |
| Comparison 9 (no addition) | 11.8 | 42.5 |
| Example 11: | | |
| 0.2% of blend AD 0.5% of Araldit GT 6071 | 3.8 | 44.2 |

The compounds used in the Examples are: Araldit® GT 6071 (Ciba-Geigy AG; CH): digylcidyl ether of bisphenol A having an epoxy value of 2.15–2.22 eq/kg and a softening temperature from 70° to 75° C.

Irganox® B 225 (Ciba-Geigy AG; CH): 1:1 mixture of the pentaerythrityl ester of β-(3,5-di-tert-butyl-4-hydroxyphenyl)propionic acid and tris(2,4-di-tert-butylphenyl)phosphite

| blend AD | 40 parts of calcium oxide 10 parts of calcium stearate 25 parts of Irganox ® B 225 (Ciba-Geigy AG; CH) |
| --- | --- |

What is claimed is:

1. A polyester/polycarbonate blend which upon thermal processing increases in molecular weight and provides enhanced mechanical properties comprising:

a) at least metal oxide or metal salt of a fatty acid, $b_1$) at least one phosphite and at least one sterically hindered phenol, and $b_2$) at least one difunctional epoxy resin, containing 0.01–10 parts of component a) 0.02–5 parts of component b) and 0.01–5 parts of component b) and 0.01–5 parts of component b) per 100 parts of PES/PC blend.

2. A PES/PC blend according to claim 1, which is a PES/PC recyclate.

3. A PES/PC blend according to claim 1, wherein component a) is either a metal oxide of an element of the 2nd main group or 2nd, 4th or 7th auxiliary groups, or a zinc, magnesium, aluminium, tin or calcium salt of the series of the aliphatic saturated $C_2$–$C_{22}$carboxylates, the aliphatic olefinic $C_3$–$C_{22}$carboxylates, the aliphatic $C_2$–$C_{22}$carboxylates which are substituted by at least one OH group, the cyclic or bicyclic $C_5$–$C_{22}$carboxylates, the aromatic $C_7$–$C_{22}$carboxylates, the aromatic $C_7$–$C_{22}$carboxylates which are substituted by at least one OH group, the $C_1$–$C_{16}$alkyl-substituted phenylcarboxylates and the phenyl-$C_1$–$C_{16}$alkylcarboxylates.

4. A PES/PC blend according to claim 1, wherein component a) is either an oxide of calcium, magnesium, zinc, titanium or manganese or a stearate, laurate, behenate, laevulinate, citrate, lactate or thioglycolate of zinc, magnesium, aluminium, tin or calcium.

5. A PES/PC blend according to claim 1, wherein component $b_1$) is a phosphite of one of the formulae

(III)

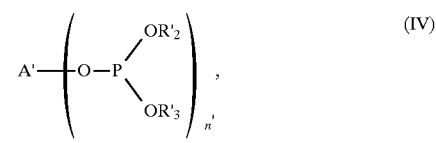

(IV)

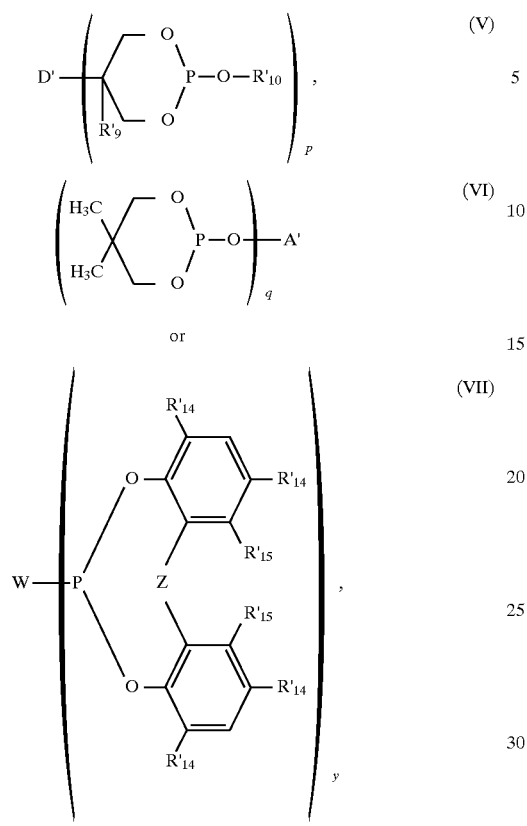

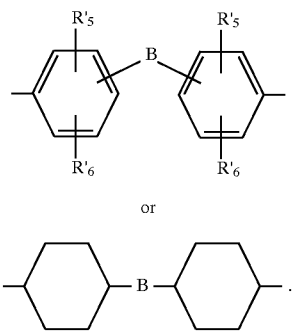

or

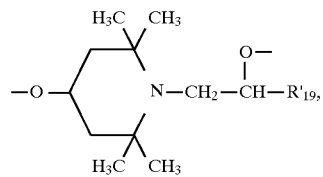

wherein

R'$_1$, R'$_2$ and R'$_3$ are each independently of one another alkyl of 1 to 18 carbon atoms, alkyl of 1 to 18 carbon atoms which is substituted by halogen, —COOR$_4$', —CN or —CONR$_4$'R$_4$'; alkyl of 2 to 18 carbon atoms which is interrupted by —S—, —O— or —NR'$_4$—; cycloalkyl of 5 to 8 carbon atoms; phenyl or naphthyl; phenyl or naphthyl, each of which is substituted by halogen, 1 to 3 alkyl radicals or alkoxy radicals containing a total of 1 to 18 carbon atoms; 2,2,6,6-tetramethylpiperid-4-yl, N-allyl- or N-benzyl- or N-alkyl-2,2,6,6-tetramethylpiperid-4-yl containing 1 to 4 carbon atoms in the alkyl moiety, or N-alkanoyl-2,2,6,6-tetramethylpiperid-4-yl containing 1 to 4 carbon atoms in the alkyl moiety, or N-alkylene-2,2,6,6-tetramethylpiperidyl or N-alkylene-4-alkoxy-2,2,6,6-tetramethylpiperidyl containing 1 to 3 carbon atoms in the alkylene moiety and 1 to 18 carbon atoms in the alkoxy moiety;

each R'$_4$ is independently hydrogen, alkyl of 1 to 18 carbon atoms, cycloalkyl containing 5 to 12 carbon atoms, or phenylalkyl containing 1 to 4 carbon atoms in the alkyl moiety, n' is 2, 3 or 4, A', if n' or q=2, is alkylene of 2 to 12 carbon atoms, alkylene of 2 to 12 carbon atoms which is interrupted by —S—, —O— or —NR'$_4$—, wherein R'$_4$ has the given meaning, or a radical of formula A', if n' or q=3, is a radical of formula —C$_r$H$_{2r-1}$— or N(CH$_2$CH$_2$)$_3$, wherein r is 5 or 6, A', if n'=4, is the radical of formula C(CH$_2$)$_4$, R$_5$ and R$_6$ are each independently of the other hydrogen or alkyl of 1 to 8 carbon atoms, B is a radical of formula —CH$_2$—, —CHR'$_4$—, —CR'$_1$R'$_4$—, —S— or a direct bond, wherein R'$_1$ and R'$_4$ have the indicated meaning, p is 1 or 2, D', if p=1, is methyl and, if p=2, is —CH$_2$OCH$_2$—, R'$_9$ is methyl, and R'$_{10}$ has the meaning of R'$_1$, q is 2 or 3, y is 1, 2 or 3, W, if y=1, is alkyl of 1 to 18 carbon atoms, a radical of formula —OR'$_{16}$, —NR'$_{17}$R'$_{18}$ or fluoro, W, if y=2, is a radical of formula —O—A"—O— or $$-O-\overset{H_3C\ \ CH_3}{\underset{H_3C\ \ CH_3}{\bigcirc}}-N-CH_2-\overset{O-}{\underset{|}{CH}}-R'_{19},$$

W, if y=3, is a radical of formula R'$_4$C(CH$_2$O)$_3$, N(C$_2$H$_4$O)$_3$ or N(C$_3$H$_6$O)$_3$, wherein R'$_4$ has the given meaning, R'$_{16}$ has the meaning of R'$_1$, R'$_{17}$ and R'$_{18}$ are each independently of the other alkyl of 1 to 18 carbon atoms, benzyl, cyclohexyl, a 2,2,6,6-tetra- or 1,2,2,6,6-pentamethylpiperid-4-yl radical, or R'$_{17}$ and R'$_{18}$, taken together, are butylene, pentylene, hexylene or the radical of formula —CH$_2$CH$_2$—O—CH$_2$CH$_2$—, A", if n'=2, is A', R'$_{19}$ is hydrogen or methyl, the substituents R'$_{14}$ are independently of one another hydrogen, alkyl of 1 to 9 carbon atoms or cyclohexyl, R'$_{15}$ is hydrogen or methyl, and Z is a direct bond, —CH$_2$—, —C(R'$_{14}$)$_2$— or —S—, wherein the substituents R'$_{14}$ are identical or different and have the indicated meaning;

and a sterically hindered phenol of formula II,

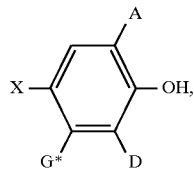
(II)

wherein

A is hydrogen, $C_1$–$C_{24}$alkyl, $C_5$–$C_{12}$cycloalkyl, phenyl-$C_1$–$C_4$alkyl, phenyl or a group —$CH_2$—S—$R_{25}$ or

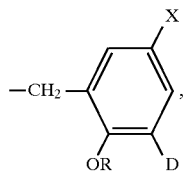

D is $C_1$–$C_{24}$alkyl, $C_5$–$C_{12}$cycloalkyl, phenyl-$C_1$–$C_4$alkyl, phenyl or a group —$CH_2$—S—$R_{25}$, X is hydrogen, $C_1$–$C_{18}$alkyl or one of the groups —$C_aH_{2a}$—$S_q$—$R_{26}$, —$C_bH_{2b}$—CO—O$R_{27}$, —$C_bH_{2b}$—CO—N($R_{29}$)($R_{30}$), —$CH_2$N($R_{34}$)($R_{35}$),

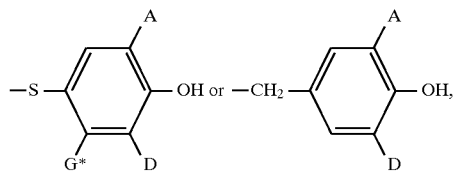

R is hydrogen or a group of formula —CO—CH=$CH_2$,

G* is hydrogen or $C_1$–$C_{12}$alkyl, $R_{25}$ is $C_1$–$C_{18}$alkyl, phenyl or a group —($CH_2$)$_c$—CO—O$R_{28}$ or —$CH_2CH_2OR_{33}$,

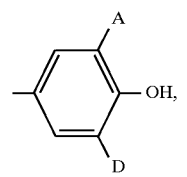

$R_{26}$ is hydrogen, $C_1$–$C_{18}$alkyl, phenyl, benzyl or a group or

—($CH_2$)$_c$—CO—O$R_{28}$ or —$CH_2CH_2$—O$R_{33}$, $R_{27}$ is $C_1$–$C_{30}$alkyl or one of the groups —CHR$_{31}$— $CH_2$—S—$R_{32}$,

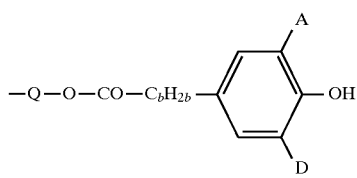

or

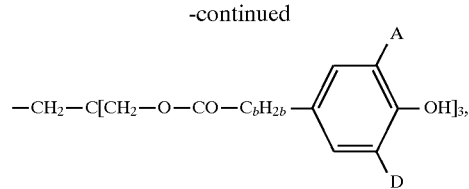

wherein Q is $C_2$–$C_8$alkylene, $C_4$–$C_6$thiaalkylene or a group —$CH_2CH_2$(O$CH_2CH_2$)$_d$—, $R_{28}$ is $C_1$–$C_{24}$alkyl, $R_{29}$ is hydrogen, $C_1$–$C_{18}$alkyl or cyclohexyl, $R_{30}$ is $C_1$–$C_{18}$alkyl, cyclohexyl, phenyl, $C_1$–$C_{18}$alkyl-substituted phenyl or one of the groups

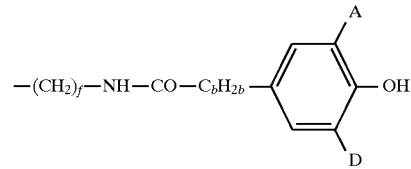

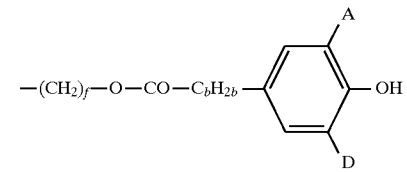

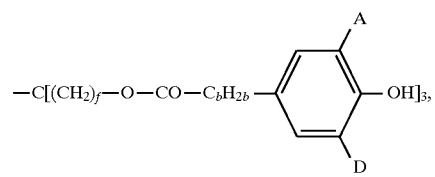

or $R_{29}$ and $R_{30}$, taken together, are $C_4$–$C_8$alkylene which may be interrupted by —O— or —NH—, $R_{31}$ is hydrogen, $C_1$–$C_4$alkyl or phenyl, $R_{32}$ is $C_1$–$C_{18}$alkyl, $R_{33}$ is hydrogen, $C_1$–$C_{24}$alkyl, phenyl, $C_2$–$C_{18}$alkanoy or benzoyl, $R_{34}$ is $C_1$–$C_{18}$alkyl, cyclohexyl, phenyl, $C_1$–$C_{18}$alkyl-substituted phenyl or a group

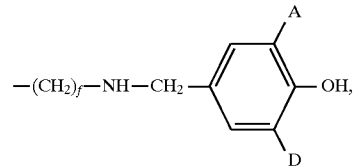

$R_{35}$ is hydrogen, $C_1$–$C_{18}$alkyl, cyclohexyl, or a group

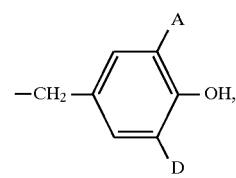

or $R_{34}$ and $R_{35}$, taken together, are $C_4$–$C_8$alkylene which may be interrupted by —O— or —NH—, a is 0, 1, 2 or 3, b is 0, 1, 2 or 3, c is 1 or 2, d is 1 to 5, f is 2 to 8, and q is 1, 2, 3 or 4.

6. A PES/PC blend according to claim 1, wherein component $b_1$) contains a phosphite selected from the group consisting of tris(2,4-di-tert-butylphenyl)phosphite;

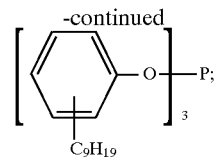

-continued

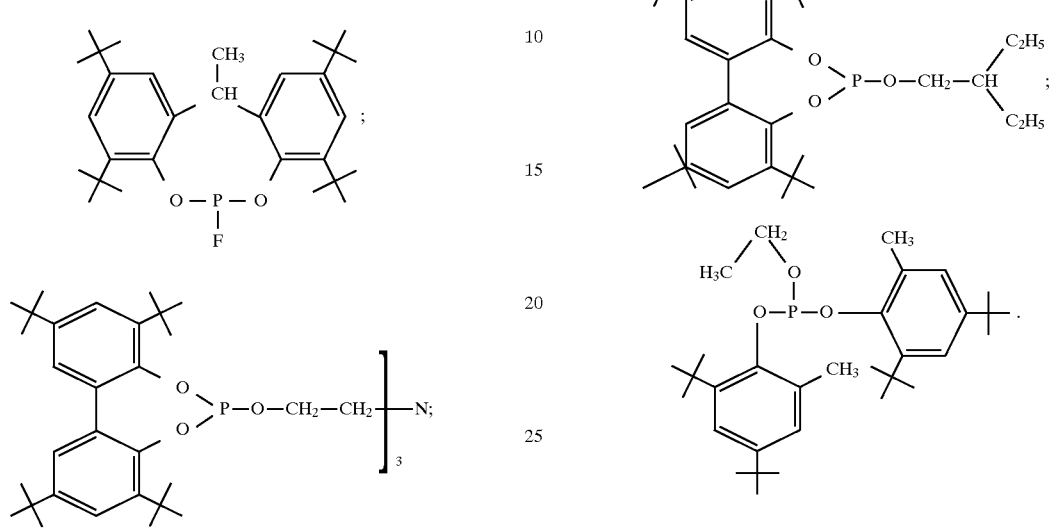

7. A PES/PC blend according to claim 1, wherein component $b_1$) contains a sterically hindered phenol

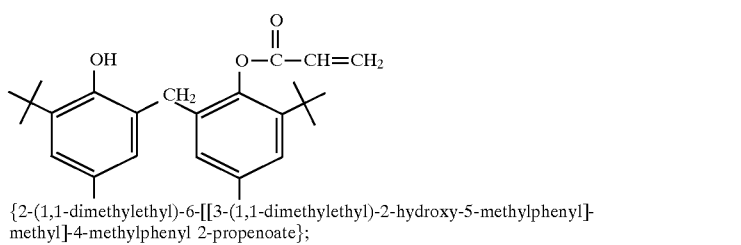

{2-(1,1-dimethylethyl)-6-[[3-(1,1-dimethylethyl)-2-hydroxy-5-methylphenyl]-methyl]-4-methylphenyl 2-propenoate};

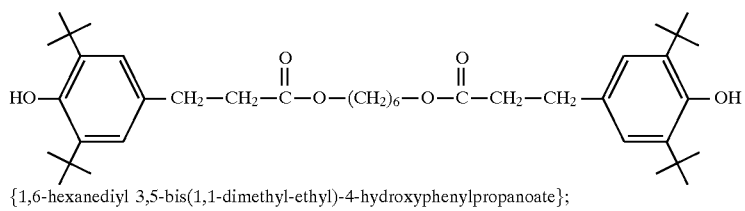

{1,6-hexanediyl 3,5-bis(1,1-dimethyl-ethyl)-4-hydroxyphenylpropanoate};

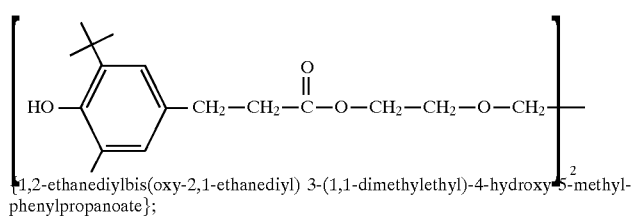

{1,2-ethanediylbis(oxy-2,1-ethanediyl) 3-(1,1-dimethylethyl)-4-hydroxy-5-methyl-phenylpropanoate};

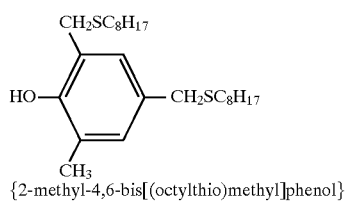

{2-methyl-4,6-bis[(octylthio)methyl]phenol};

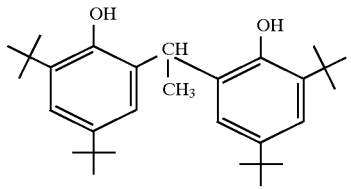

{2,2'-ethylidenebis(4,6-di-tert-butylphenol)};

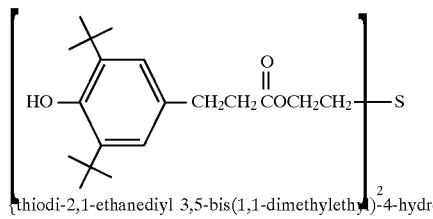

{thiodi-2,1-ethanediyl 3,5-bis(1,1-dimethylethyl)-4-hydroxyphenylpropanoate};

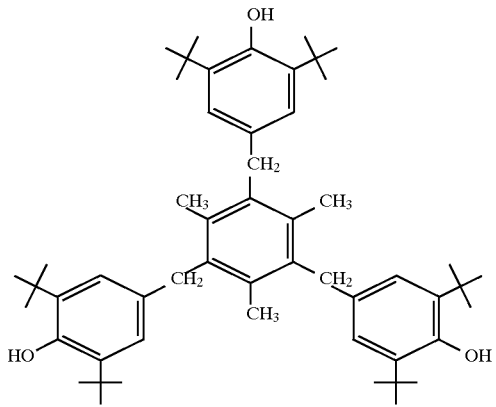

{4,4',4"-[(2,4,6-trimethyl-1,3,5-phenyltriyl)-tris(methylene)]tris[2,6-bis(1,1-dimethyl-ethyl)phenol};

the pentaerythrityl, octyl and octadecyl ester of β-(3,5-di-tert-butyl-4-hydroxyphenyl)propionic acid.

8. A PES/PC blend according to claim 1, wherein component $b_2$) is an epoxy resin of the diglycidyl ether of bisphenol A, diglycidyl terephthalate, diglycidyl ether of bisphenol F, diglycidyl isophthalate or triglycidyl trimellate type or

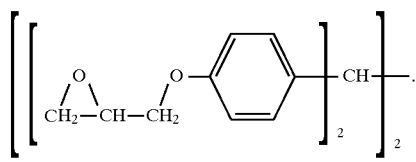

9. A PES/PC blend according to claim 1, comprising 0.05–1 part of component a), 0.02–2 parts of component $b_1$) and 0.02–2 parts of component $b_2$) per 100 parts of PES/PC blend.

10. A PES/PC blend according to claim 1, wherein the PES/PC blend is based on PBT/PC, PET/PC, PBT/PET/PC, PBT/PC/ABS, PBT/PET/PC/ABS or PBT/PC/ASA.

11. A PES/PC blend according to claim 1, wherein the PES/PC blend is a PBT/PC blend.

12. A process for increasing the molecular weight and enhancing the properties of polyester/polycarbonate blends (PES/PC blends) upon thermal processing which comprises subjecting the PES/PC blends to thermal processing with the addition of:

a) at least metal oxide or metal salt of a fatty acid, $b_1$) at least one phosphite and at least one sterically hindered phenol, and $b_2$) at least one difunctional epoxy resin, at a temperature above the melting point of the PES/PC blends using 0.01–10 parts of component a), 0.02–5 parts of component b) and 0.01–5 parts of component b) per 100 parts of PES/PC blend.

13. A PES/PC blend obtainable in accordance with the process according to claim 12.

14. The PES/PC blend of claim 1, wherein the epoxide functional groups of component $b_2$ are terminal or pendant functional groups.

15. The process of claim 12, wherein the epoxide functional groups of component $b_2$ are terminal or pendant functional groups.

* * * * *